United States Patent [19]

Fujimoto

[11] Patent Number: 5,091,860
[45] Date of Patent: Feb. 25, 1992

[54] NUMERICAL CONTROL DEVICE INCLUDING TAPPING PITCH DATA GROUP MEMORY

[75] Inventor: Akihiko Fujimoto, Aichi, Japan
[73] Assignee: Mitsubishi Denki K.K., Tokyo, Japan
[21] Appl. No.: 409,833
[22] Filed: Sep. 20, 1989
[30] Foreign Application Priority Data
  Sep. 20, 1988 [JP] Japan .................. 63-233666
[51] Int. Cl.⁵ ............ G05B 19/18; G06F 15/46
[52] U.S. Cl. ............ 364/474.11; 364/474.21; 364/474.3; 318/569
[58] Field of Search .......... 364/474.02, 474.11, 364/474.21, 474.3, 474.12, 474.15, 474.19; 318/569, 571, 573

[56] References Cited

U.S. PATENT DOCUMENTS

| | | | |
|---|---|---|---|
| 4,521,860 | 6/1985 | Kanematsu et al. | 364/474.21 |
| 4,636,938 | 1/1987 | Broome | 364/191 |
| 4,656,405 | 4/1987 | Kiya et al. | 318/571 |
| 4,704,689 | 11/1987 | Asakura | 364/474.02 |
| 4,739,488 | 4/1988 | Asakura | 364/474.27 |
| 4,879,660 | 11/1989 | Asakura et al. | 364/474.3 |
| 4,941,104 | 7/1990 | Teshima et al. | 364/474.31 |
| 4,972,322 | 11/1990 | Asakura et al. | 364/474.21 |
| 4,992,712 | 2/1991 | Fujimoto et al. | 364/474.15 |

Primary Examiner—Jerry Smith
Assistant Examiner—Thomas E. Brown
Attorney, Agent, or Firm—Sughrue, Mion, Zinn, Macpeak & Seas

[57] ABSTRACT

A numerical control device used in conjunction with a machine tool including a spindle head having a plurality of tapping tools is provided with a tapping pitch data group memory which stores the tapping pitch of each tool. Upon selection of a tool according to a machining program, a corresponding data group is retrieved from memory and from this data group an average tapping pitch is obtained. According to the average value thus obtained, a suitable feed rate is selected.

2 Claims, 3 Drawing Sheets

F: FEED SPEED OF FEED SHAFT MOTOR
K: FEED SPEED CONSTANT
S: SPINDLE HEAD ROTATION NUMBER
P: AVERAGE TAPPING PITCH

NUMERICAL CONTROL DEVICE INCLUDING TAPPING PITCH DATA GROUP MEMORY

BACKGROUND OF THE INVENTION

This invention relates to numerical control devices, and more particularly to a numerical control device (hereinafter referred to merely as "an NC device", when applicable) which allows the spindle of a machine, which has a spindle head with a plurality of tapping tools, to be fed most suitably with respect to rotation of the tapping tools.

FIG. 6 is a diagram showing the arrangement of a conventional NC device.

In FIG. 6, reference numeral 1 designates a memory comprising a RAM, which stores programs and data; 2, a control section essentially including a CPU 2a, which controls the functions of the NC device according to the system software loaded in the memory 1; 3, an arithmetic operation section for performing numerical operations under the control of the control section; 4, a tape reader for reading a paper tape in which an NC machining program (hereinafter, referred to merely as "a machining program", when applicable) has been stored by perforation; 5, a program interface; 6, a feed shaft drive section including a servo amplifier etc.; 7, a feed shaft motor for driving a feed shaft; 8, a feed shaft encoder for outputting a feedback signal; and 9, an input/output signal interface provided for input signals required for starting and stopping the NC device, and for output signals such as an NC device state signal and auxiliary function signals for controlling external equipments which are controlled by the NC device. The aforementioned machining program may be stored in a floppy disc instead of a paper tape.

Further in FIG. 6, reference numeral 20 designates a speed reducer; 21, a drive mechanism such as a ball screw; and 22, the movable table of the machine on which a workpiece is set.

Further in FIG. 6, reference numeral 26 designates the aforementioned spindle; 27, a spindle motor; 28, a spindle amplifier for amplifying a spindle motor drive signal; 30, a gear train for changing the rotation number (rpm) of the spindle motor 27 to transmit the torque of the latter to a spindle head 31 (described later); 31, the aforementioned spindle head holding a plurality of tapping tools 161 through 164 and transmitting the torque of the spindle motor 27 transmitted through the gear train 30, to the tapping tools; 32, a spindle encoder, or a detector coupled to the spindle motor 27 at a rate of 1:1; and 33, a spindle encoder interface for applying the output of the spindle encoder 32 to the control section 2.

The above-described tapping tools 161, 162, 163 and 164 are different in pitch. Therefore, in tapping a workpiece 15 with the tapping tools, the feed shaft is moved according to the average of the pitches of the tapping tools which is manually calculated so that the load of the tapping tool cushioning mechanism is reduced as much as possible.

The tapping tool cushioning mechanism functions as follows: The tapping tool moves one pitch every revolution (in the case where it is of a single threaded screw). When the movement of the tapping tool is not coincided with the mechanical feed, the difference in movement between both is absorbed by the tapping tool cushioning mechanism.

In the case of FIG. 6, the workpiece 15 is moved. However, it goes without saying that, with the workpiece 15 held stationary, the spindle 26 may be moved by the feed shaft motor 7 while the tapping tools are being rotated.

With the above-described conventional NC device, the average pitch of the plurality of tapping tools is calculated manually, as was described above. This operation takes a lot of time, and will be more troublesome in the case where a workpiece is machined with a machine having a spindle head which is replaceable.

SUMMARY OF THE INVENTION

An object of this invention is to eliminate the above-described difficulties accompanying a conventional NC device. More specifically, an object of the invention is to provide an NC device which is provided with a memory which stores data representing the tapping values of tapping tools, as a data group for each spindle head, so that the average pitch of the tapping tools is automatically calculated to move the feed shaft.

An NC device according to the invention comprises a tapping pitch data group memory which stores data representing the tapping pitches of tapping tools as a data group for every spindle head, so that, when a tool number is specified according to a machining program, the corresponding data group is read from the tapping pitch data group memory, and the average value of the data group thus read is automatically calculated, stored in an average tapping pitch data memory, and utilized to optionally feed the spindle most suitably with respect to rotation of the tapping tools.

With the NC device according to the invention, upon specification of a tool number according to a machining program, the data group corresponding to the tool number thus specified is read from the tapping pitch data group memory in which a plurality of data groups have been stored, and the average pitch thereof is automatically calculated and utilized, so that the spindle is fed at the most suitable speed.

DETAILED DESCRIPTION OF THE INVENTION

Figure 1:
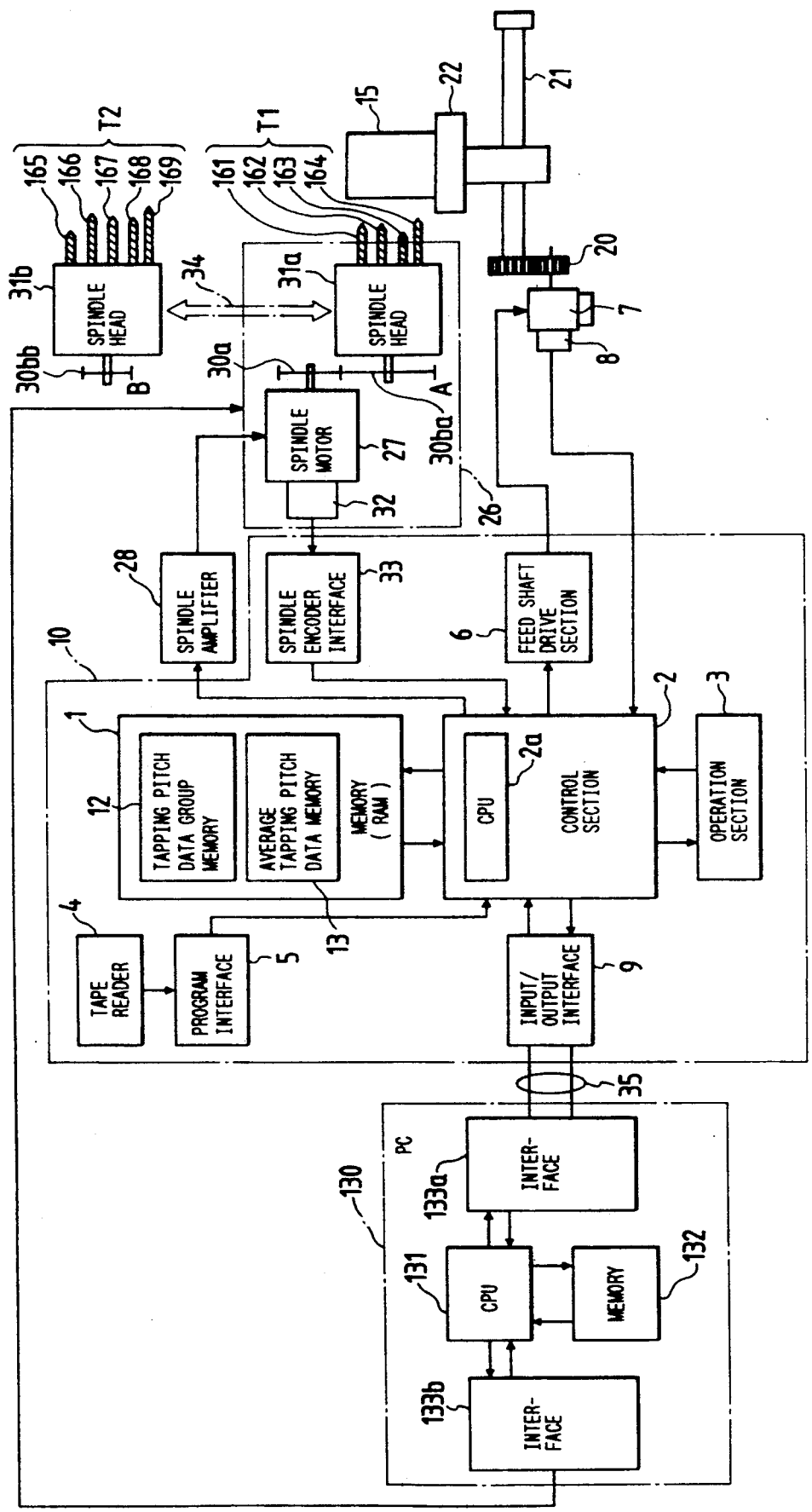
FIG. 1 is a diagram showing the arrangement of one embodiment of this invention.
Figure 2:
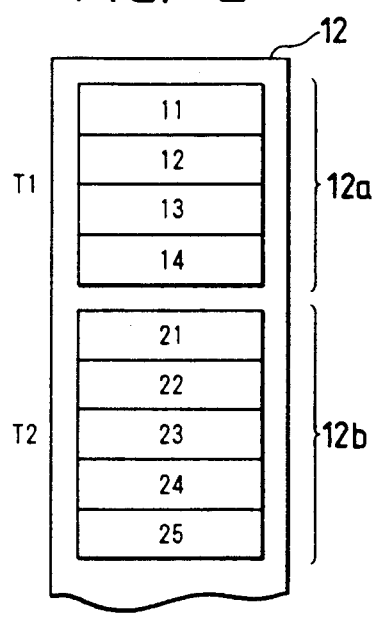
FIG. 2 is an explanatory diagram showing a tapping pitch data group memory in the embodiment of the invention.
Figure 3:
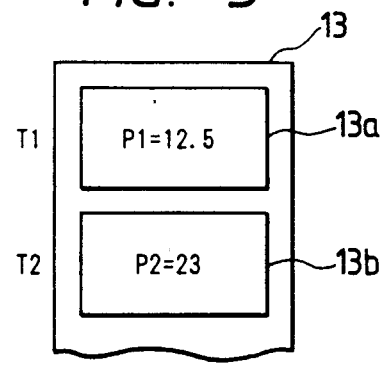
FIG. 3 is an explanatory diagram showing an average tapping pitch data memory in the embodiment of the invention.
Figure 4:
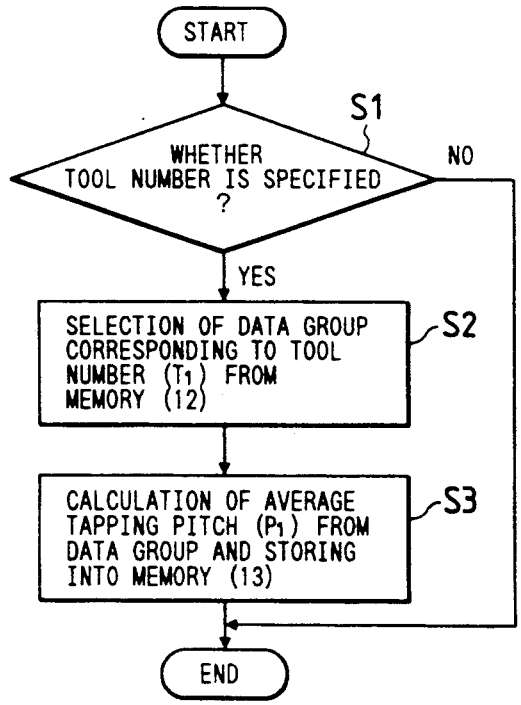
FIG. 4 is a flow chart showing an operation of calculating an average tapping pitch.
Figure 5:
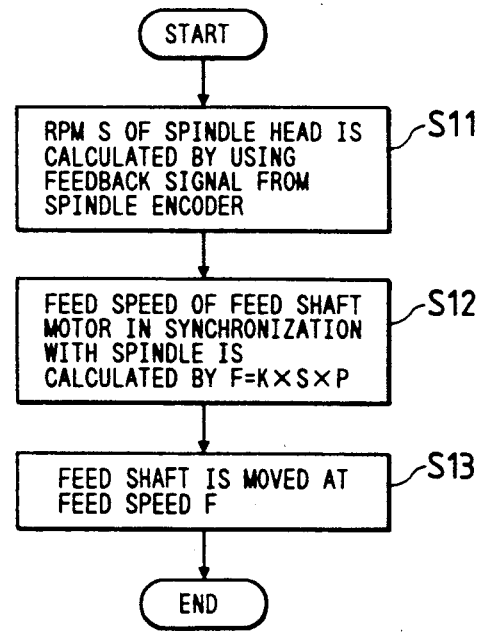
FIG. 5 is a flow chart showing an operation of calculating a feed speed.

FIG. 1 is a diagram showing the arrangement of one embodiment of this invention. FIG. 2 is an explanatory diagram showing a tapping pitch data group memory. FIG. 3 is an explanatory diagram showing an average taping pitch data memory. FIGS. 4 and 5 are flow charts showing the operation of the embodiment shown in FIG. 1.

Figure 6:
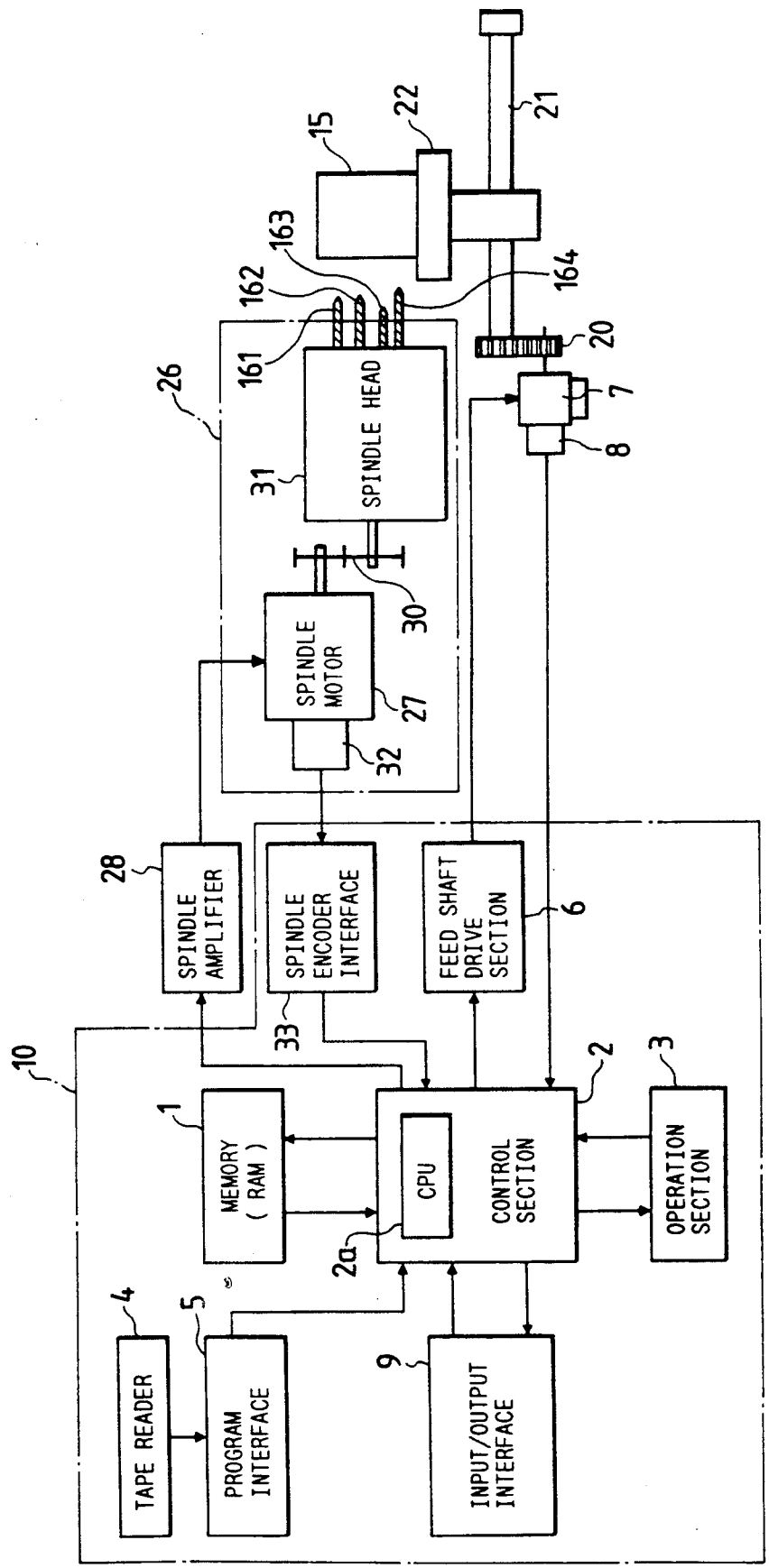
FIG. 6 is a diagram showing the arrangement of a conventional NC device.

In FIG. 1, those components which have been already described with reference to FIG. 6 are therefore designated by the same reference numerals or characters. Further in FIG. 1, reference numeral 12 designates a tapping pitch data group memory which occupies a part of the memory 1, to store data representing the pitches of the tapping tools as described later; and 13, an average tapping pitch data memory which occupies a part of the memory 1, to store data representing an average tapping pitch of each spindle head. A spindle head 31a holds tapping tools 161, 162, 163 and 164. The spindle head 31a is the same as the spindle head 31 shown in FIG. 6, however, it is designated differently so as to be distinguished from another spindle head 31b (described later). The spindle heads 31a and 31b can be replaced by each other, and they are replaced together with gears 30ba and 30bb. In FIG. 1, the arrow 34 indicates that the spindle heads 31a and 31b can be replaced by each other.

The spindle head 31b holds tapping tools 165, 166, 167, 168 and 169. A tool group consisting of the tapping tools 161 through 164 has a tool number T1, and a tool group consisting of the tapping tools 165 through 169 has a number T2.

As shown in FIG. 2, the tapping tools 161, 162, 163 and 164 held by the spindle head 31a have pitches 11, 12, 13 and 14, respectively, which are stored, as a data group 12a, in the tapping pitch data group memory 12. Similarly, the tapping tools 165, 166, 167, 168 and 169 held by the spindle head 31b have pitches 21, 22, 23, 24 and 25, respectively, which are stored, as a data group 12b, in the tapping pitch data group memory 12.

The average tapping pitch data memory 13 stores the average tapping pitches which are calculated using the data groups 12a and 12b. The average tapping pitch P1=12.5 of the spindle head 31a is stored in a region 13a, and the average tapping pitch P2=23 of the spindle head 31b is stored in a region 13b.

The operation of the NC device 10 will be described with reference to a flow chart shown in FIG. 4. First, calculation of an average tapping pitch will be described.

In Step S1, it is determined whether or not the tool number (e.g., T1) is specified according to the machining program. If "yes", then in Step S2, the data group (e.g., 12a for tool T1) of the spindle head (e.g., 31a for tool T1) is read out of the memory 12. In the case where tool number T1 is specified in Step 3, the average tapping pitch P1 is calculated by using the data group 12a, and it is stored in the memory 13.

The NC device 10 operates as described above. On the other hand, a PC (programable controller) 130 performs a sequence control as follows: That is, when it is determined that the tool number T1 has been specified in Step S1 (i.e., when the result of the determination is "yes"), the tool number T1 is transferred through a bus 35 to the PC 130, and the PC 130 performs a spindle head replacing sequence control. As a result, the spindle head (not shown) used is removed, and the spindle head holding the tapping tools 161 through 164 is mounted on the spindle 26.

Now, another operation of the NC device 10, namely, calculating a feed speed to control the movement of the feed shaft will be described with reference to a flow chart shown in FIG. 5.

In Step S11, the rotation number (rpm) S of the spindle head 31a is calculated by using the feedback signal provided by the spindle encoder 32. The calculation is carried out as follows: The gear ratios A and B for transmission of the torque of the spindle motor 27 to the spindle heads 31a and 31b are stored in the memory 1 in advance similarly as in the case of the tapping pitch data groups. When the tool number T1 is specified, the gear ratio A is referred to; and when the tool number T2 is specified, the gear ratio B is referred to, and the following calculation is performed to determine the rotation number S of the spindle head:

(Spindle motor rotation number)×(gear ratio)

The term "spindle head rotation number S" as used herein is intended to mean the rotation number (rpm) of the tapping tools 161 through 164 or 165 through 169.

In Step S12, $F=K\times S\times P$ is calculated, so as to obtain the feed speed which is in synchronization with the rotation of the tools; i.e., which makes the feed of the spindle most suitable with respect to the rotation of the tools. In the above described equation,
F is the feed shaft motor's feed speed,
K is the feed speed constant,
S is the spindle head rotation number, and
P is the average tapping pitch.

In Step S13, the feed shaft is moved at the feed speed F.

Thus, the spindle is fed most suitably with respect to the rotation of the tapping tools, that is, a synchronous operation control is performed.

When the tool number T2 is specified according to the machining program, that is, when the spindle head 31b is selected, similarly as in the above-described case the spindle head 31a is replaced by the spindle head 31b, the tapping pitch data group 12b is selected, the average pitch P2 is obtained, and the feed speed of the feed shaft motor is calculated from $F=K\times S\times P$. Thus, the synchronous operation of the spindle and the feed shaft is carried out.

In the above-described embodiment, the automatic replacement of the spindle head is achieved according to the sequence control of the PC 30, however, it should be noted that the technical concept of the invention is applicable to the machining apparatus which comprises an NC device and a machine to be controlled thereby and the spindle head is manually replaced.

As was described above, according to the invention, the numerical control device is provided with the tapping pitch data group memory which stores the data representing the tapping pitches of the tapping tools as a data group for each spindle head. Therefore, with the numerical control device, the average tapping pitch is automatically calculated, so that the spindle is fed most suitably.

What is claimed is:

1. A numerical control device for feeding a spindle head having a plurality of tapping tools at a most suitable speed with respect to the rotation of the tapping tools,
said numerical control device comprising:
a data processing section including a memory and a central processing unit for analyzing and computing numerical input data, and for performing numerical control of a machine to be controlled including rotation of a spindle on which said spindle head having a plurality of tapping tools is mounted;
a tapping pitch data group memory for storing data representing tapping pitches of tapping tools held by a spindle head as a data group for each spindle head; and synchronous operation control means for reading, when a tool number is specified according to a machining program, a corresponding data group out of said tapping pitch data group memory, obtaining an average value of said data group thus read, and feeding said spindle with respect to rotation of said tapping tools in accordance with said average value.

2. A numerical control device as defined in claim 1 wherein a plurality of interchangeable spindle heads are provided, each having a plurality of tapping tools, and wherein a tapping pitch data group memory is provided for storing data representing tapping pitches of tapping tools held by a corresponding spindle head as a data group for each spindle head.

* * * * *